United States Patent
Lincoln

[15] 3,690,696
[45] Sept. 12, 1972

[54] VEHICLE BODY PASSIVE OCCUPANT RESTRAINING ARRANGEMENT

[72] Inventor: Clark Lincoln, Detroit, Mich.
[73] Assignee: General Motors Corporation, Detroit, Mich.
[22] Filed: April 20, 1971
[21] Appl. No.: 135,625

[52] U.S. Cl. .........................................280/150 SB
[51] Int. Cl. ...........................................B60r 21/02
[58] Field of Search.....................280/150 SB, 150 B

[56] References Cited

UNITED STATES PATENTS

| | | | |
|---|---|---|---|
| 2,858,144 | 10/1958 | Oppenheim | 280/150 SB |
| 3,499,681 | 3/1970 | Benitez | 280/150 SB |
| 3,506,083 | 4/1970 | Bontick | 280/150 SB |
| 3,583,726 | 6/1971 | Lindblad | 280/150 SB |

*Primary Examiner*—Benjamin Hersh
*Assistant Examiner*—Robert R. Song
*Attorney*—W. E. Finken and Herbert Furman

[57] ABSTRACT

A vehicle body passive occupant restraining arrangement includes a vehicle body defining an occupant compartment in which is mounted a vehicle seat accessible through a vehicle body side door opening, a side door having upper and lower panels pivoted to each other about a longitudinal vehicle axis at their lower and upper edges respectively, a hinge arrangement pivotally mounting the upper edge of the upper panel to the vehicle body about a longitudinal vehicle axis adjacent the upper edge of the door opening, a link extending between the vehicle body and the lower panel and cooperable with the hinge arrangement to mount the door for vertical movement between a lower closed position and an upper folded open position, a generally triangular restraining vest having two portions respectively secured adjacent upper and lower inboard portions of the seat and having a generally elongated belt portions, an inertia retractor receiving the belt portion and slidably mounted on a lower inboard edge portion of the lower panel of the door for longitudinal movement with respect to the vehicle body, and a drive mechanism for moving the retractor along the door between forward and rearward positions in response to door opening and closing movement. During upward door opening movement, the drive mechanism moves the retractor to the forward position to move the restraining vest to an easy-enter position with the belt portion pointing upwardly and forwardly of the vehicle body and allowing convenient occupant access to the seat. During downward door closing movement, the drive mechanism moves the retractor to the rearward position to move the restraining vest to a restraining position across a seated occupant with the belt portion pointing downwardly and rearwardly of the vehicle body and retracted by the retractor to maintain the restraining vest in a taut condition across the occupant.

2 Claims, 4 Drawing Figures

INVENTOR.
Clark Lincoln
BY
Herbert Furman
ATTORNEY

VEHICLE BODY PASSIVE OCCUPANT RESTRAINING ARRANGEMENT

This invention relates to a vehicle body passive occupant restraining arrangement.

It is known to provide a vehicle body passive occupant restraining belt arrangement in which a vehicle body door is conventionally mounted for swinging movement about a generally vertical axis and slidably supports a carrier that attaches one end of a restraining belt, with the carrier sliding in one direction during door opening movement to move the restraining belt to an easy-enter position, and with the carrier sliding in the opposite direction during door closing movement to move the restraining belt to an occupant restraining position. It is also known to provide a vehicle body occupant restraining belt arrangement in which a restraining belt has one end received by a retractor mounted on a vehicle body side door that conventionally swings about a generally vertical axis between open and closed positions.

This invention provides a vehicle body passive occupant restraining arrangement in which a vehicle body side door has an upper edge longitudinally pivoted to a vehicle body adjacent an upper edge of a side door opening and has a lower edge that slidably supports an inertia retractor receiving a generally elongated belt portion of a generally triangular restraining vest which is moved between easy-enter and occupant restraining positions by sliding longitudinal movement of the retractor along the door in response to opening and closing vertical movement of the door.

In the preferred embodiment of the invention, the restraining arrangement includes a side door with upper and lower panels pivoted to each other about a longitudinal axis at their lower and upper edges respectively, a hinge arrangement pivotally mounting the upper edge of the upper panel to the vehicle body about a longitudinal vehicle axis adjacent the upper edge of the vehicle body side door opening, a link extending between the vehicle body and the lower panel and cooperable with the hinge arrangement to mount the door for vertical movement between a lower closed position and an upper folded open position, a generally triangular restraining vest having two portions respectively secured adjacent upper and lower inboard portions of a vehicle seat and having a generally elongated belt portion received by an inertia retractor slidably mounted on a lower edge portion of the lower panel of the door, and a drive mechanism for moving the retractor along the door between forward and rearward positions in response to opening and closing vertical movement of the door. The drive mechanism moves the retractor to the forward position during upward door opening movement to move the restraining vest to an easy-enter position with the belt portion pointing upwardly and forwardly of the vehicle body and allowing convenient occupant access to the seat. During downward door closing movement, the drive mechanism moves the retractor to the rearward position to move the restraining vest to a restraining position across a seated occupant with the belt portion pointing downwardly and rearwardly of the vehicle body and retracted by the retractor to maintain the restraining vest in a taut condition across the occupant.

Accordingly, an object of this invention is to provide a vehicle body passive occupant restraining arrangement in which a vehicle body side door has an upper edge longitudinally pivoted to a vehicle body adjacent a side door opening and a lower edge slidably mounting an inertia retractor that receives a generally elongated belt portion of a generally triangular restraining vest which is moved to an easy-enter position by the sliding forward movement of the retractor during upward door opening movement and moved to an occupant restraining position by the sliding rearward movement of the retractor during downward door closing movement.

Another object of this invention is to provide a vehicle body passive occupant restraining arrangement that includes a vehicle body side door having upper and lower panels mounted on the vehicle body for vertical movement between an upper folded open position and a lower closed position, with the lower panel slidably supporting an inertia retractor that receives a belt portion of a generally triangular restraining vest which is moved between easy-enter and occupant restraining positions by longitudinal sliding movement of the retractor during vertical door opening and closing movement.

These objects and other objects of this invention will be readily apparent from the following detailed description and drawings in which.

Figure 3:
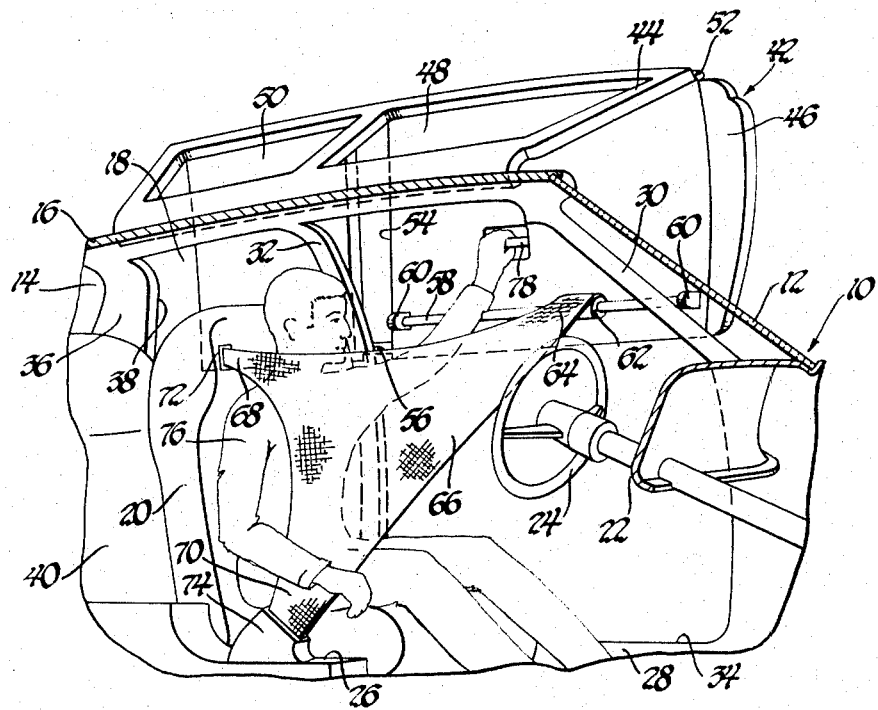
FIG. 3 is a view similar to FIG. 1 with the door and restraining vest moved slightly further toward the open and easy-enter positions than in FIG. 2.
Figure 4:
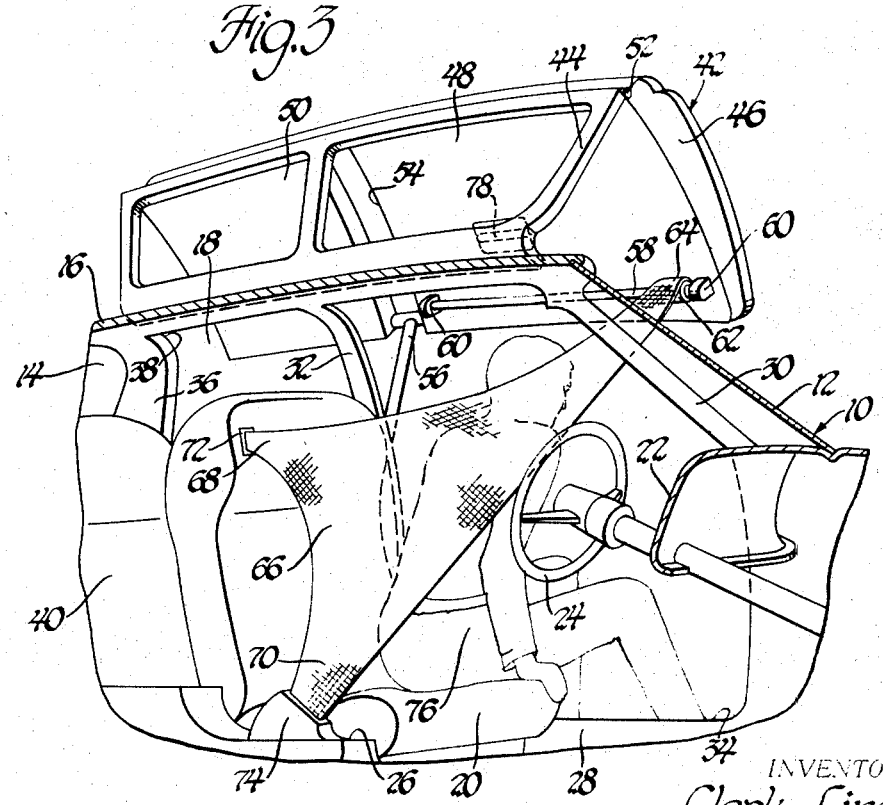
FIG. 4 is a view similar to FIG. 1 with the door and restraining vest in the open and easy-enter positions.

Referring now to the drawings, a vehicle body generally indicated by 10 includes a windshield 12, a rear window 14, a roof 16, and a vehicle body floor (not shown) that cooperate to define an occupant compartment 18. A conventional vehicle front seat 20 is mounted within the occupant compartment 18 in the usual manner rearward of an instrument panel 22 and steering wheel 24 and outboard of a transmission tunnel mounted console 26. As best seen in FIGS. 3 and 4, a rocker structure 28, a front pillar 30, a center pillar 32, and the roof 16 cooperate to define a front side door opening 34 for providing access to the seat 20. Likewise, a sail panel 36 cooperates with the rocker structure 28, the center pillar 32, and the roof 16 to define a rear side door opening 38 for providing access to a rear seat 40 conventionally positioned behind seat 20.

Figure 1:
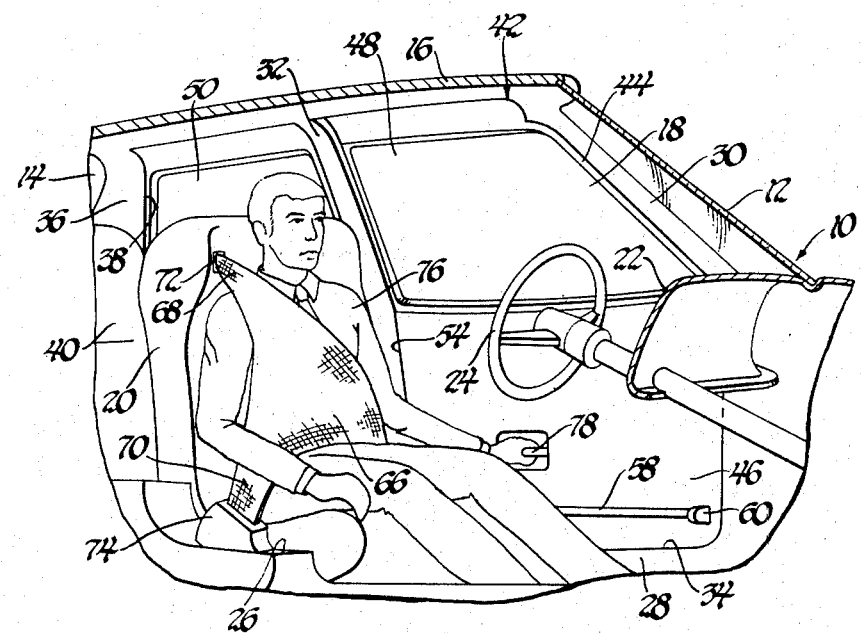
FIG. 1 is a sectional view in perspective of a portion of the interior of a vehicle body that includes a passive occupant restraining arrangement, according to the invention, with a door in closed position and a restraining vest in an occupant restraining position.
Figure 2:
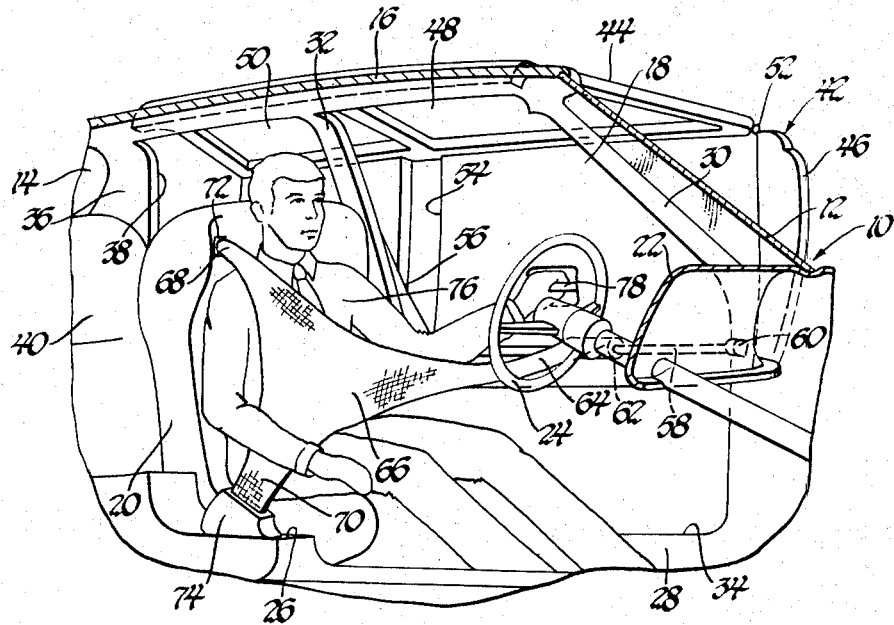
FIG. 2 is a view similar to FIG. 1 with the door and restraining vest moved partially toward open and easy-enter positions, respectively.

A door generally indicated by 42 includes an upper panel 44 and a lower panel 46. The upper panel 44 includes front and rear side windows 48 and 50, respectively, and is pivoted to the roof 16 for movement about a longitudinal vehicle axis adjacent the upper edges of door openings 34 and 38 by a hinge arrangement that is not shown. The upper edge of the lower panel 46 is pivoted to the lower edge of the upper panel 44 about a longitudinal vehicle axis by a hinge arrangement 52 and includes a vertical slot 54 for receiving the lower portion of center pillar 32 when door 42 is in the FIG. 1 closed position. The lower end of slot 54 receives one end of a link 56 whose other end is suitably mounted on vehicle body 10 such that the link 56 and the hinge arrangements cooperably mount the door 42 for movement between the lower closed position of FIG. 1 and the upper folded open position of FIG. 4 through the partially open positions of FIGS. 2 and 3.

As best seen in FIGS. 3 and 4, a generally elongated rod 58 is mounted in a generally longitudinally extending direction on the lower edge of lower panel 46 by front and rear brackets 60. An inertia retractor 62 is mounted on rod 58 for longitudinal sliding movement, as will be more fully hereinafter described, and receives a generally elongated belt portion 64 of a generally triangular restraining vest 66 which also includes portions 68 and 70 respectively secured to an attachment 72 on an upper inboard portion of the back of seat 20 and an attachment 74 on console 26.

A conventional drive mechanism, not shown, is mounted within the lower panel 46 of door 42 and is suitably connected to the inertia retractor 62 to move the retractor along rod 58 in response to door movement. When the door 42 is in the FIG. 4 open position, the drive mechanism positions the retractor 62 adjacent the front bracket 60, with the belt portion 64 protracted from the retractor and pointing upwardly and forwardly to maintain the restraining vest 66 in an easy-enter position allowing an occupant 76 convenient access to seat 20. When an occupant assumes a seated position with the restraining vest in the easy-enter position as during entrance to the vehicle body 10, the occupant's right arm will be positioned between the portions 68 and 70 of the restraining vest 66 and the occupant's left hand is free to grasp a handle 78 on the lower panel 46 slightly above rod 58. The occupant then moves the door downwardly from the position of FIG. 4 to the position of FIG. 3 and concomitant therewith the drive mechanism moves the inertia retractor 62 rearwardly along rod 58. During the continued downward closing movement of the door 42 from the position of FIG. 3 through the position of FIG. 2 to the position of FIG. 1, the drive mechanism continues to move the inertia retractor 62 rearwardly until the retractor is positioned in a rearward position adjacent the rear bracket 60. With the retractor moved to this position, the belt portion 64 points downwardly and rearwardly of the vehicle body 10 and is retracted by the retractor to position the restraining vest in the FIG. 1 position across the occupant without requiring any effort on the part of the occupant. When the occupant moves the door upwardly from the FIG. 1 position through the FIG. 2 and 3 positions to the FIG. 4 door open position, the drive mechanism moves the retractor 62 forwardly along rod 58 to move the vest 66 to the easy-enter position.

During the movement of the door 42 between the open and closed positions, the inertia retractor 62 will retract and extend the belt portion 64 of restraining vest 66 as required by the vertical positioning of rod 58 and the longitudinal positioning of the retractor on rod 58. The inertia retractor, of course, will not extend the belt portion 64 at a rate faster than that which will cause the retractor to lock.

The drive mechanism which moves the retractor 62 along rod 58 may include an arcuate gear rack fixedly mounted on the upper panel 44 and engageable with a suitable rotatable pinion mounted on the lower panel 46, with the pinion supporting a pulley that drives a continuous cable which is connected to the retractor such that the retractor is moved forwardly and rearwardly in response to the angular position between upper and lower panels 44 and 46. It is also possible for the drive mechanism to include a suitable electric motor and a suitable circuit responsive to the angular position between the upper and lower panels 44 and 46 or responsive to the angular position of link 56 with respect to the lower panel 46 to drive the motor and move the retractor forwardly and rearwardly by a continuous cable connected to the retractor.

It should be noted that preferably the retractor 62 does not move rearwardly of the occupant's left arm unless the door 42 is sufficiently closed such that the retractor is below the occupant's left arm. If this is the case, opening and closing movement of door 42 is possible without any interference between the belt portion 64 and the occupant's left arm.

The invention thus provides an improved vehicle body passive occupant restraining arrangement.

What is claimed is:

1. In a vehicle body including a roof and a floor defining an occupant compartment in which is mounted a vehicle seat accessible by way of a vehicle body side door opening adjacent the seat, a passive occupant restraining arrangement comprising, a side door having an upper edge pivoted to the vehicle body about a longitudinal vehicle axis adjacent the upper edge of the door opening and movable between a lower closed position and an upper open position, a generally triangular restraining vest having two portions respectively secured adjacent upper and lower inboard portions of the seat and having a generally elongated belt portion, an inertia retractor receiving the belt portion, means mounting the retractor on the door adjacent a lower inboard edge portion thereof for longitudinal movement with respect to the vehicle body, and drive means for moving the retractor along the door between forward and rearward positions in response to door opening and closing movement, the drive means moving the retractor to the forward position during door opening movement to move the restraining vest to an easy-enter position with the belt portion pointing upwardly and forwardly of the vehicle body and allowing convenient occupant access to the seat, the drive means moving the retractor to the rearward position during door closing movement to move the restraining vest to a restraining position across a seated occupant with the belt portion pointing downwardly and rearwardly of the vehicle body and being retracted by the retractor to maintain the restraining vest in a taut condition across the occupant.

2. In a vehicle body including a roof and a floor defining an occupant compartment in which is mounted a vehicle seat accessible by way of a vehicle body side door opening adjacent the seat, a passive occupant restraining arrangement comprising, a side door including upper and lower panels pivoted to each other about a longitudinal vehicle axis at their lower and upper edges respectively, hinge means pivotally mounting the upper edge of the upper panel to the vehicle body at a longitudinal vehicle axis adjacent the upper edge of the door opening, linkage means extending between the vehicle body and the lower panel and cooperable with the hinge means to mount the door for movement between a lower closed position and an upper folded open position, a generally triangular restraining vest having two portions respectively secured adjacent upper and lower inboard portions of the seat and having a generally elongated belt portion, an inertia retractor receiving the belt portion, means mounting the retractor on a lower inboard edge portion of the lower panel of the door for longitudinal movement with respect to the vehicle body, and drive means for moving the retractor along the door between forward and rearward positions in response to door opening and closing movement, the drive means moving the retractor to the forward position during door opening movement to move the restraining vest to an easy-enter position with the belt portion pointing upwardly and forwardly of the vehicle body and allowing convenient occupant access to the seat, the drive means moving the retractor to the rearward position during door closing movement to move the restraining vest to a restraining position across a seated occupant with the belt portion pointing downwardly and rearwardly of the vehicle body and being retracted by the retractor to maintain the restraining vest in a taut condition across the occupant.

* * * * *